(12) United States Patent
Karenos et al.

(10) Patent No.: US 8,515,953 B2
(45) Date of Patent: Aug. 20, 2013

(54) TEMPORAL VISUALIZATION OF QUERY RESULTS

(75) Inventors: Kyriakos Karenos, London (GB); Francesco Nidito, London (GB); Milad Shokouhi, Cambridge (GB); Igor Nitto, London (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/306,111

(22) Filed: Nov. 29, 2011

(65) Prior Publication Data

US 2013/0138638 A1    May 30, 2013

(51) Int. Cl.
    *G06F 17/30* (2006.01)
(52) U.S. Cl.
    USPC ........... 707/725; 707/728; 707/737; 715/763; 715/215
(58) Field of Classification Search
    USPC .......... 707/725, 728, 737, 999.001; 715/763, 715/215
    See application file for complete search history.

(56) References Cited

U.S. PATENT DOCUMENTS

| | | | |
|---|---|---|---|
| 6,650,998 B1 | 11/2003 | Rutledge et al. | |
| 7,698,657 B2 * | 4/2010 | Gemmell et al. | 715/833 |
| 7,788,592 B2 | 8/2010 | Williams et al. | |
| 2003/0009493 A1 | 1/2003 | Parker et al. | |
| 2006/0248073 A1 * | 11/2006 | Jones et al. | 707/5 |
| 2008/0059899 A1 * | 3/2008 | Gemmell et al. | 715/767 |
| 2008/0082578 A1 * | 4/2008 | Hogue et al. | 707/104.1 |
| 2008/0270391 A1 * | 10/2008 | Newbold et al. | 707/5 |
| 2008/0301106 A1 * | 12/2008 | Oral et al. | 707/3 |
| 2009/0254825 A1 | 10/2009 | Sichart et al. | |
| 2010/0114985 A1 * | 5/2010 | Chaudhary et al. | 707/803 |
| 2010/0114991 A1 * | 5/2010 | Chaudhary et al. | 707/809 |

OTHER PUBLICATIONS

Alonso, et al., "Clustering and Exploring Search Results using Timeline Constructions", Retrieved at <<http://ants.iis.sinica.edu.tw/3BkMJ9ITeWXTSrrvNoKNFDxRm3zFwRR/87/(CIKM09)Clustering%20and%20exploring%20search%20results%20using%20timeline%20constructions.pdf>>, Proceeding of the 18th ACM conference on Information and knowledge management, Nov. 2-6, 2009, pp. 97-106.

Meina, Michal, "Query-context Search Result Clustering basing on Graphs", Retrieved at <<http://csp2011.mimuw.edu.pl/proceedings/PDF/CSP2011346.pdf>>, http://csp2011.mimuw.edu.pl/proceedings/PDF/CSP2011346.pdf, Sep. 28-30, 2011, pp. 346-352.

(Continued)

*Primary Examiner* — Dennis Truong
(74) *Attorney, Agent, or Firm* — Microsoft Corporation (57) ABSTRACT

One or more techniques and/or systems are disclosed for constructing a temporal visualization of query results. That is, query results associated with temporal information, such as timestamps, may be used to create a temporal distribution (e.g., query results comprising images and image capture dates, web pages and web page creation dates, etc.). The temporal distribution may comprise a distribution of the query results over time (e.g., query results may be sorted and/or grouped based upon dates specified by the timestamps). A temporal visualization of the query results may be constructed using the temporal distribution. For example, query results may be assigned to date slots within the temporal visualization. The temporal visualization may illustrate a substantial number of query results (e.g., thousands) that may otherwise not be visually presentable at once. Zoom commands and/or hover commands may be processed to provide finer and/or coarser granularity of the query results.

20 Claims, 10 Drawing Sheets

(56) References Cited

OTHER PUBLICATIONS

Alonso, et al., "Exploratory Search Using Timelines", Retrieved at <<http://citeseerx.ist.psu.edu/viewdoc/download?doi=10.1.1.112.9517&rep=rep1&type=pdf>>, In SIGCHI 2007 Workshop on Exploratory Search and HCI Workshop, 2007, pp. 4.

Hertzfeld, Andy, "Introducing Google News Timeline", Retrieved at <<http://googlenewsblog.blogspot.com/2009/04/introducing-google-news-timeline.html>>, Retrieved Date: Sep. 15, 2011, pp. 3.

"International Search Report", Mail Date: Apr. 30, 2013, Application No. PCT/US2012/065139, Filed date: Nov. 15, 2012, pp. 9.

* cited by examiner

TEMPORAL VISUALIZATION OF QUERY RESULTS

BACKGROUND

Searching tools, such as a search engine, may provide a user with query results in response to a query submitted by the user. The query results may comprise a subset of available data, which may be tailored to the interests of the user as expressed by the query. Searching tools may be available for various types of data, such as a web search engine (e.g., for web pages, web images, web videos, etc.), a database search tool (e.g., for database entries), a file system search tool (e.g., for files stored by a file system), and/or a variety of other search tools for various data. Current searching tools generally provide query results as a list of data. In one example, a web search engine may provide a list of search result web pages organized by relevancy. In another example, an image searching tool may provide a visual list of search result images organized by relevancy. Unfortunately, searching tools may not present query results in a manner that may facilitate further exploration of query results beyond a first portion of the returned results. For example, merely 10 search results may be presented per search result page such that a user may have to navigate to a second search result page to see search results 11-20, a third search result page to see search results 21-30, etc.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for creating a temporal visualization of query results are disclosed herein. For example, query results associated with a query may be received. The query results may, for example, be provided by a searching tool (e.g., a web search engine may provide web page search results, an image search engine may provide image search results, a social network may provide social network updates, an ecommerce website may provide product information, a database search engine may provide database entries, etc.). It may be appreciated that the query results may comprise various types of data associated with temporal information, such as timestamps (e.g., a crawl and/or creation date associated with a web page, a publication date associated with a social network update, a creation date associated with a video, a first access date associated with an image, etc.).

A temporal distribution of the query results may be created based upon timestamps associated with respective query results. For example, the query results may be organized and/or sorted according to dates specified by the timestamps (e.g., the query results may be organized based upon publication dates). A temporal visualization of the query results may be constructed using the temporal distribution. In one example, the temporal visualization may illustrate query results as a graph (e.g., an X axis may comprise a date range comprising date slots to which query results may be assigned (e.g., plotted as points within the graph), and a Y axis may comprise markings representing numbers of query results per date slot). In this way, a distribution of query results (e.g., thousands of query results) may be illustrated within the temporal visualization according to dates (e.g., as opposed to conventional query result pages that may display, for example, 10 query results per page sorted according to relevancy).

Visual indicators may be associated with date slots and/or query results assigned to date slots. For example, a visual indicator (e.g., a color indicator) may be associated with one or more query results assigned to a date slot within the temporal visualization based upon a total number of query results assigned to the date slot. For example, a date slot Feb. 7, 2010 may comprise a substantial number of query results associated with a query "Super Bowl" (e.g., a number of query results above a threshold, such as 300 query results). The query results assigned to date slot Feb. 7, 2010 may be colored red to visually indicate to a user that date slot Feb. 7, 2010 may comprise interesting/relevant query results (e.g., given the abundance of results at this time, at least some results in this set of query results are likely to be particularly relevant to the query). In this way, the user may quickly identify date slots likely to comprise interesting/relevant query results.

Because such a large amount of query results may be illustrated within the temporal visualization, query results may be assigned relevancy rankings so that subsets of query results may be presented to the user. For example, a user may hover over a particular date slot within the temporal visualization using a cursor. A subset of query results assigned to the date slot may be identified based upon the subset of query results being assigned desired relevancy rankings (e.g., a number N of query results assigned comparatively high relevancy rankings may be identified as the subset of query results for the date slot; query results comprising relevancy rankings above a threshold ranking may be identified as the subset of query results for the date slot; etc.). In this way, the subset of query results, which may be highly interesting and/or relevant to the user, may be presented to the user.

A storyline may be constructed from the temporal visualization to aid a user in viewing the query results. For example, one or more date slots within the temporal visualization may be identified based upon the one or more date slots comprising concentrations of query results (e.g., a date slot assigned a number of query results above a threshold number). The storyline may be constructed from at least one query result from respective date slots (e.g., a query result from a date slot may be used based upon the query result being assigned a desired relevancy ranking). In this way, the storyline may comprise one or more search results highly representative of the query, which may "tell a story" of the query results over time (e.g., the storyline may illustrate query results that may be representative of the query from various dates).

Various commands may be received through the temporal visualization. For example, a zoom command comprising a selected time span of the temporal visualization may be received (e.g., zoom-in command and/or a zoom-out command). A second temporal visualization comprising query results associated with the selected time span may be created and/or presented. In this way, a user may interact with the temporal visualizations to explore the query results at various levels of granularity.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing subject matter.

Today, users create, organize, share, search, and/or interact with a plethora of data, such as images, videos, files, social network information, etc. In one example, a user may upload images to a photo sharing website. The photo sharing website may comprise an image search engine that may allow other users to search for and/or interact with such images. In another example, an ecommerce website may comprise a database search engine that may provide consumers with product information retrieved from a products database. Generally, query results are presented to a user based upon relevance of query results to a query (e.g., a first results page may comprise the top 10 relevant query results, a second results page may comprise the next top 10 relevant query results, etc.). Such query results may be presented on a small scale. For example, even though a query may return thousands of query results, merely 10 or so query results may be presented per results page.

Accordingly, among other things, one or more systems and/or techniques for creating a temporal visualization of query results are provided herein. The temporal visualization may illustrate query results within a temporal domain. That is, the temporal visualization may comprise a temporal distribution of the query results (e.g. query results may be organized, grouped, sorted, and/or illustrated based upon temporal information, such as timestamps). It may be appreciated that a wide variety of query results may be utilized in constructing a temporal visualization. For example, query results associated with temporal information, such as timestamps, may be utilized in constructing the temporal visualization (e.g., timestamps corresponding to publication dates, crawl dates, first access dates, modification dates, creation dates, and/or a variety of other dates).

Figure 1A:
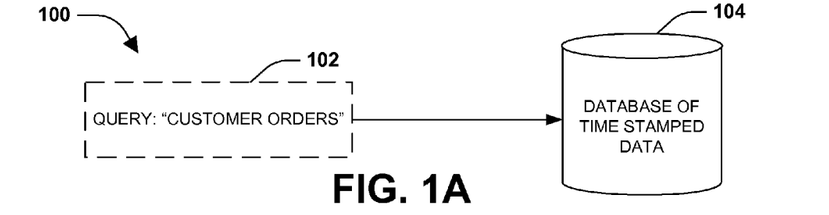
FIG. 1A is an illustration of an example of a query "customer orders" associated with a database of time stamped data.

FIG. 1A illustrates an example 100 of a query "customer orders" 102 associated with a database of time stamped data 104. In one example, a database search tool may execute the query "customer orders" 102 against the database of time stamped data 104 to create query results (e.g., customer order data comprising customer orders and dates at which respective customer orders were created). The query results may be used to construct a temporal visualization, which may comprise a distribution of customer orders over time.

Figure 1B:
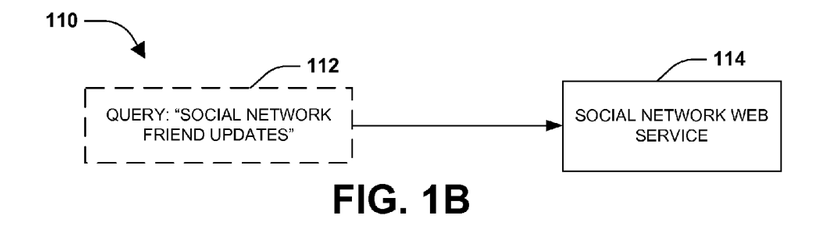
FIG. 1B is an illustration of an example of a query "social network friend updates" associated with a social network web service.

FIG. 1B illustrates an example 110 of a query "social network friend updates" 112 associated with a social network web service 114. In one example, the social network web service 114 may execute the query "social network friend updates" 112 against social network data to create query results (e.g., social network friend updates and dates at which respective social network friend updates were published). The query results may be used to construct a temporal visualization, which may comprise a distribution of social network friend updates over time.

Figure 1C:
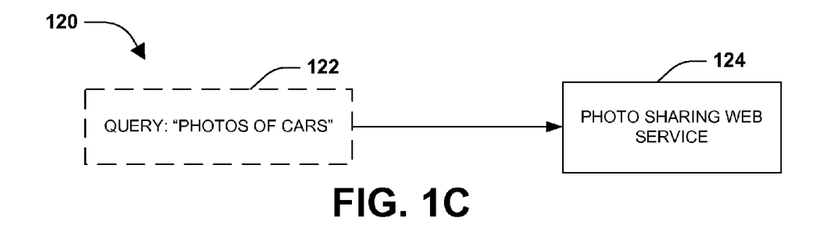
FIG. 1C is an illustration of an example of a query "photos of cars" associated with a photo sharing web service.

FIG. 1C illustrates an example 120 of a query "photos of cars" 122 associated with a photo sharing web service 124. In one example, the photo sharing web service 124 may execute the query "photos of cars" 122 against an image repository to create query results (e.g., car images and dates at which respective car images were uploaded). The query results may be used to construct a temporal visualization, which may comprise a distribution of car images over time.

Figure 1D:
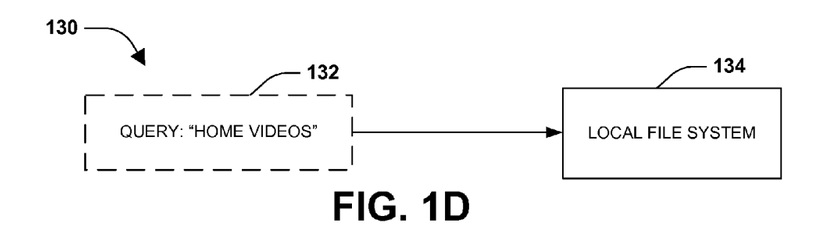
FIG. 1D is an illustration of an example of a query "home videos" associated with a local file system.

FIG. 1D illustrates an example 130 of a query "home videos" 132 associated with a local file system 134. In one example, a file search tool may execute the query "home videos" 132 against the local file system 134 to create query results (e.g., home video files and dates at which respective home video files were captured). The query results may be used to construct a temporal visualization, which may comprise a distribution of home video files over time.

Figure 1E:
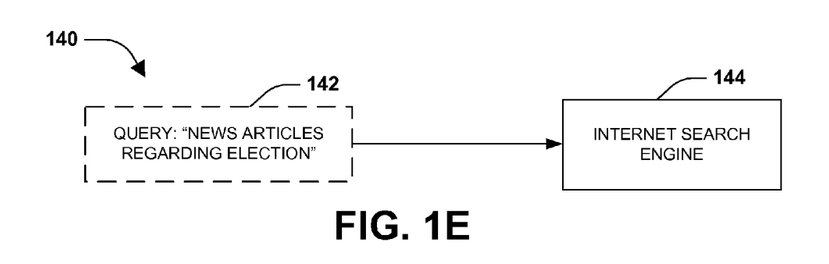
FIG. 1E is an illustration of an example of a query "news articles regarding election" associated with an internet search engine.

FIG. 1E illustrates an example 140 of a query "news articles regarding election" 142 associated with an internet search engine 144. In one example, the internet search engine 144 may execute the query "news articles regarding election" 142 to create query results (e.g., election news articles and dates at which respective election news articles were created, posted and/or crawled by the internet search engine 144). The query results may be used to construct a temporal visualization, which may comprise a distribution of election news articles over time.

Figure 2:
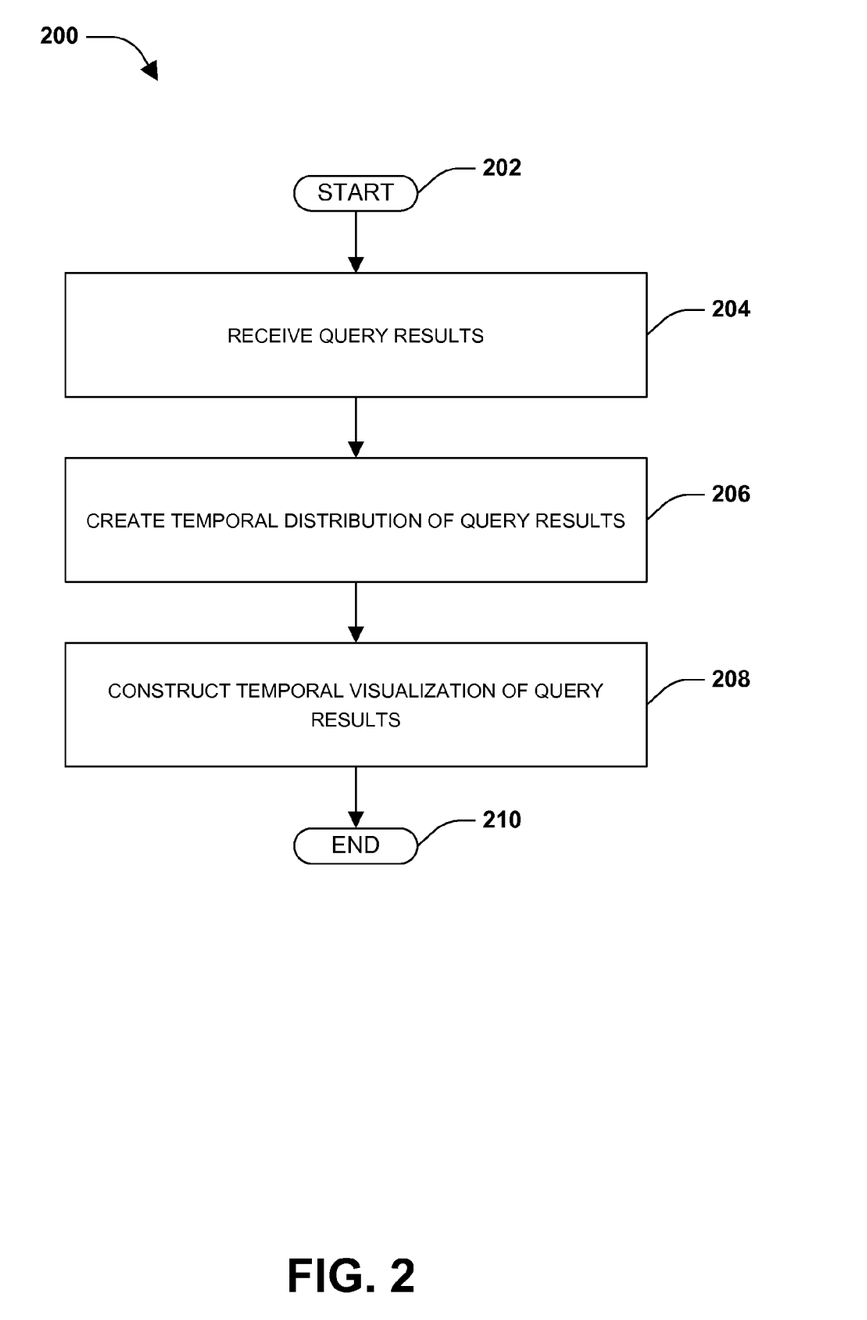
FIG. 2 is a flow chart illustrating an exemplary method of constructing a temporal visualization of query results.
Figure 4:
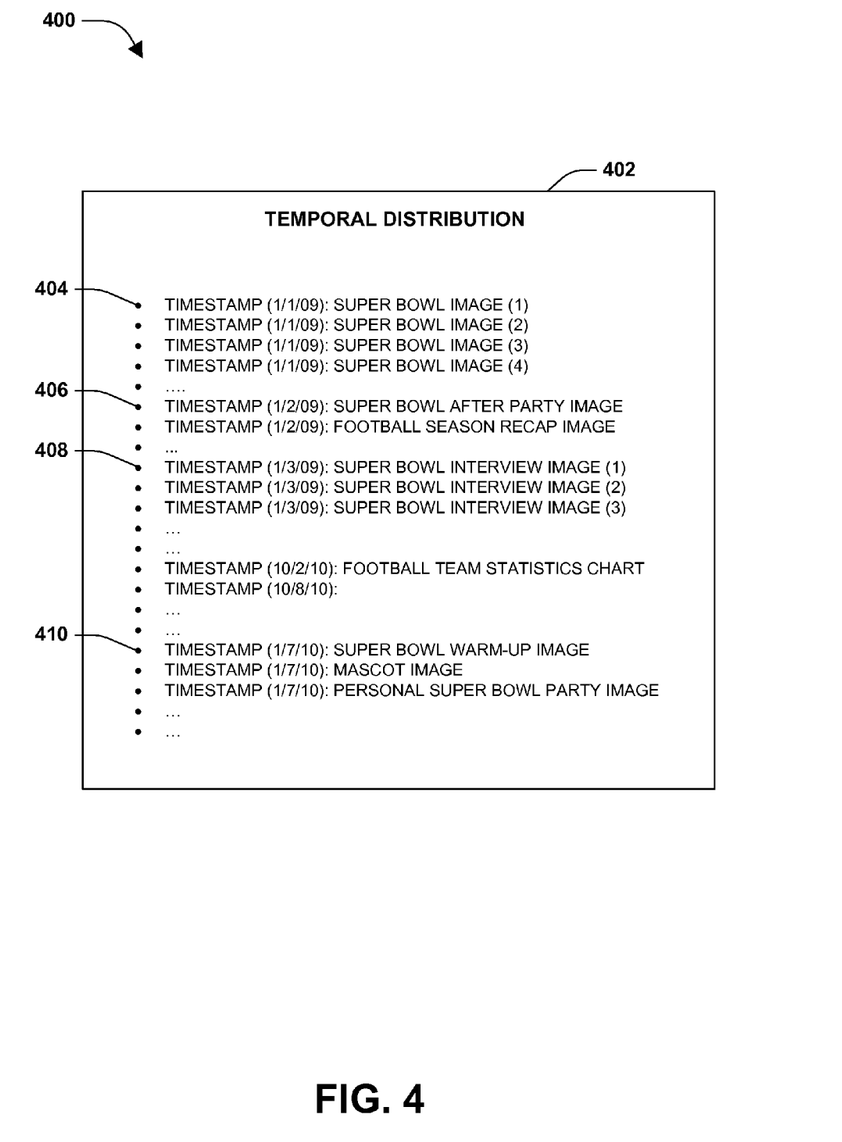
FIG. 4 is an illustration of an example of a temporal distribution.

One embodiment of constructing a temporal visualization of query results is illustrated by an exemplary method 200 in FIG. 2. At 202, the method starts. At 204, query results associated with a query may be received. For example, query results may comprise images, text, videos, web pages, social network updates, social network communication, database entries, ecommerce website data, and/or a plethora of other types of data associated with temporal information, such as timestamps (e.g., publication dates, crawl dates, first access dates, modification dates, creation dates, etc.). At 206, a temporal distribution of query results may be created based upon timestamps associated with respective query results. It may be appreciated that one example of a temporal distribution is illustrated in FIG. 4 as temporal distribution 402. In one example, the temporal distribution may comprise query results organized and/or sorted based upon dates specified by the timestamps. In another example, the temporal distribution may comprise groupings of query results associated with date slots (e.g., query results with associated timestamps of Jan. 6, 2010 may be grouped into a date slot Jan. 6, 2010, query results with associated timestamps of Jan. 7, 2010 may be grouped into a date slot Jan. 7, 2010, etc.). It may be appreciated that the query results may be organized in various manners to create the temporal distribution.

Figure 5:
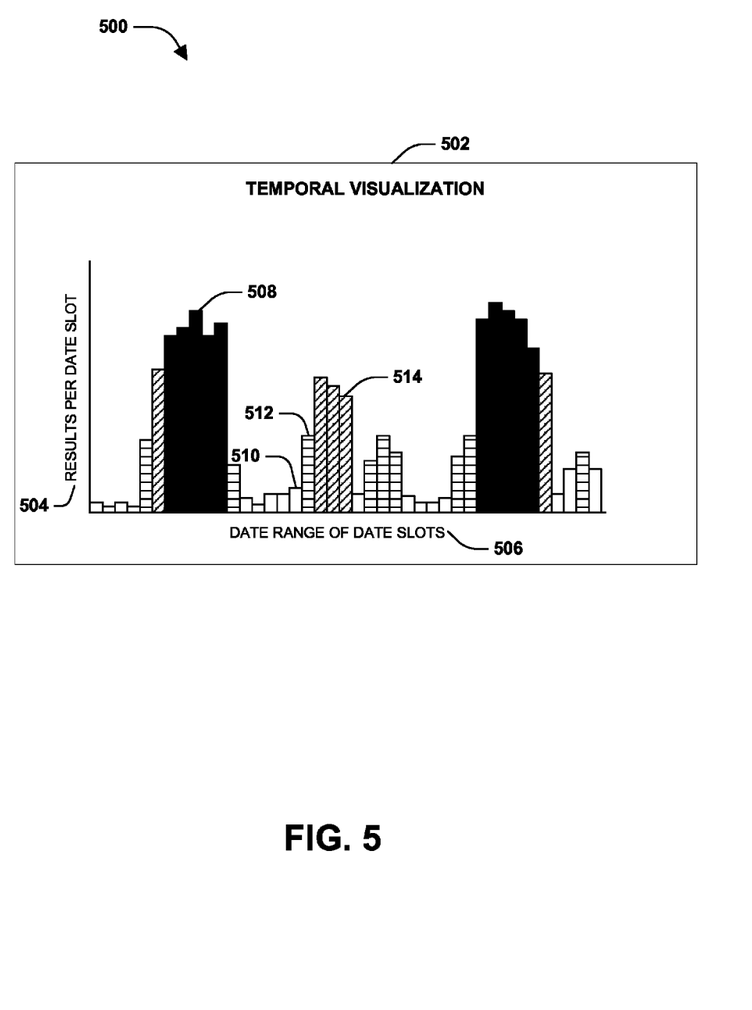
FIG. 5 is an illustration of an example of a temporal visualization comprising visual indicators.

At 208, a temporal visualization of the query results may be constructed using the temporal distribution. It may be appreciated that one example of a temporal visualization is illustrated in FIG. 5 as temporal visualization 502. It may be appreciated that the temporal visualization may be constructed in real-time during a search query session (e.g., in response to a user submitting the query to a searching tool). In one example of constructing the temporal visualization, a date range may be assigned to the temporal visualization based upon the temporal distribution (e.g., an x axis of the temporal visualization may be assigned a date range of date slots associated with dates specified within the temporal distribution). Query results may be assigned to corresponding date slots within the date range based upon respective timestamps of the query results (e.g., query results comprising a Jan. 7, 2010 timestamp may be assigned to a date slot Jan. 7, 2010 within the date range, query results comprising a Feb. 12, 2011 timestamp may be assigned to a date slot Feb. 12, 2011 within the date range, etc.). In one example, the query results may be illustrated within the temporal visualization as a graph. For example, representations of query results may be plotting along the date range (e.g., the x axis) of the temporal visualization at corresponding date slots. A y axis of the temporal visualization may comprise markings representing numbers of query results per date slot (e.g., thus forming a graph of query results per date slot). In this way, the temporal visualization may comprise a graph that represents query results as points on the graph, for example. It may be appreciated that the temporal visualization may comprise a variety of different types of graphs and/or may comprise visualizations other than graphs (e.g., graphical illustrates of query results organized and/or listed by dates, textual descriptions of query results organized and/or listed by dates, etc.). Moreover, a date slot and/or the like as used herein may comprise more than a day, such as multiple days, a week, month, etc. or less than a day, such as few hours, minutes, etc. That is, (unless clearly indicated to the contrary) a date slot and/or the like as used herein may comprise any amount of time and is not to be limited to a day, for example.

To aid a user in identifying and/or visualizing query results within the temporal visualization, visual indicators may be provided. In one example, a visual indicator may be associated with a date slot and/or one or more query results assigned to the date slot within the temporal visualization. The visual indicator may, for example, be based upon a total number of query results assigned to the date slot (e.g., query results assigned to a first date slot comprising a comparatively low number of query results may be colored green, query results assigned to a second date slot comprising a comparatively high number of query results may be colored red, etc.). In another example, a concentration of query results assigned to a date slot within the temporal visualization may be identified based upon the date slot being assigned a number of query results above a threshold number. A visual indicator may be associated with the query results and/or the date slot. In this way, a user may be able to visually identify interesting and/or relevant query results (e.g., a date slot corresponding to a day the super bowl occurred may comprise a comparatively high number of query results for a query "super bowl", and thus query results assigned to the date slot may be colored red). It may be appreciated that a variety of other visual indicators may be used (e.g., bolding of font, increasing sizes of query results, pop-up indictors, text indicators, etc.).

Because a substantial number of query results may be used to construct the temporal visualization, relevancy rankings may be assigned to query results so that subsets of query results that may be interesting and/or relevant to a user may be identified and/or presented. For example, a subset of query results assigned to a date slot within the temporal visualization may be identified based upon the subset of query results being assigned desired relevancy rankings (e.g., relevancy rankings above a threshold rank, a top N number of ranked query results for the date slot, etc.). In this way, the subset of query results may be presented within the temporal visualization (e.g., upon a user hovering over a date slot, a subset of query results comprising highly relevant query results assigned to the date slot may be presented).

A storyline may be may be constructed from the temporal vitalization to aid a user in viewing the query results. That is, because the temporal visualization may be constructed from a substantial number of query results (e.g., the temporal visualization may comprise a graph that represents thousands of query results as points on the graph), a storyline may be constructed to provide the user with a short synopsis of query results over time. The storyline may comprise one or more query results from various date slots that may be representative of the query (e.g., a query for "super bowl images" may result in a storyline comprising super bowl images, with high relevancy rankings, from date slots corresponding to dates of the super bowl over the past 30 years). In one example of creating a storyline, one or more date slots within the temporal visualization may be identified based upon the one or more date slots comprising concentrations of query results (e.g., a date slot assigned a number of query results above a threshold number). The storyline may be constructed from at least one query result from respective date slots (e.g., a query result from a date slot may be used based upon the query result being assigned a desired relevancy ranking). In this way, the storyline may comprise one or more query results highly representative of the query over time (e.g., query results from various dates that may be interesting and/or relevant to the user).

The temporal visualization may be presented to a user through an interactive interface, such as a graphical user interface, a web page, etc., which may allow the user to interact with the temporal visualization. In one example, a zoom command, such as a zoom-in command and/or a zoom-out command, comprising a selected time span of the temporal visualization may be received. A second temporal visualization comprising query results associated with the selected time span may be constructed. A zoomed-in temporal visualization may illustrate the query results at a finer granularity (e.g., thumbnail images may represent query results within the second temporal visualization, as opposed to merely points on a graph). A zoomed-out temporal visualization may illustrate the query results at a coarse granularity, which may provide the user with a "bigger picture" view of query results over a longer time range. In another example, a hover command comprising a referenced time span of the temporal visualization may be received (e.g., a user may hover over a query result and/or a date slot with a cursor, the user may select one or more query results and/or date slots with the cursor, etc.). A subset of query results assigned to the referenced time span may be presented based upon the subset of query results being assigned desired relevancy ranking. In one example, if a user hovers over a date slot, then a number N of top ranking query results assigned to the date slot may be used to create the subset of query results. In another example, if a user selects one or more query results, then the one or more query results may be used to create the subset of query results (e.g., desired relevancy rankings may represent any relevancy ranking because the user selection is specifying the exact query results to be used). In this way, the user may visually explore the query results within the temporal visualization. At 210, the method ends.

Figure 3:
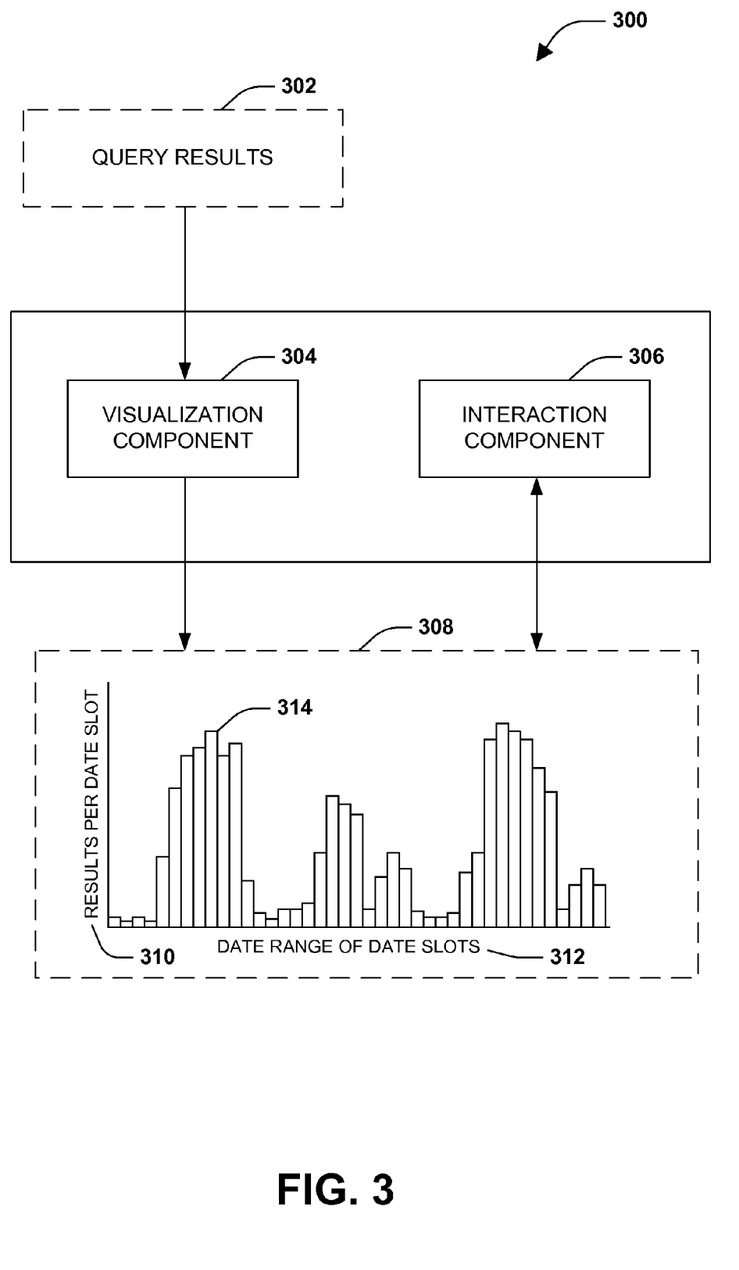
FIG. 3 is a component block diagram illustrating an exemplary system for constructing a temporal visualization of query results.

FIG. 3 illustrates an example of a system 300 configured for constructing a temporal visualization 308 of query results 302. The system 300 may comprise a visualization component 304 and/or an interaction component 306. The visualization component 304 may be configured to receive the query results 302. The query results 302 may comprise data associated with temporal information, such as timestamps. The visualization component 304 may be configured to create a temporal distribution of the query results 302 based upon timestamps associated with respective query results 302 (e.g., temporal distribution 402 of FIG. 4). In one example, the temporal distribution may comprise a distribution of the query results 302 sorted based upon dates specified by the timestamps (e.g., publication dates, creation dates, upload dates, etc.).

The visualization component 304 may construct the temporal visualization 308 of the query results 302 using the temporal distribution. For example, a date range of date slots 312 may be assigned to the temporal visualization 308 as an x axis of a graph, and markings representing results per date slot 310 may be assigned to the temporal visualization 308 as a y axis of the graph. In this way, query results 302 may be assigned to date slots within the temporal visualization 308 (e.g., query results 302 may be plotted as thumbnails, text, symbols, and/or points, etc. within the graph).

The visualization component 304 may be configured to associate a visual indicator with one or more query results assigned to a date slot within the temporal visualization 308 based upon a total number of query results, for example, assigned to the date slot. For example, date slot 314 may comprise a comparatively high concentration of query results. The visualization component 304 may detect the high concentration, and may assign a visual indicator to date slot 314 (e.g., query results assigned to date slot 314 may be colored red). In this way, a user may visually identify potentially interesting and/or relevant query results.

The visualization component 304 may be configured to construct a storyline. For example, the visualization component 304 may identify one or more date slots within the temporal visualization 308 comprising concentrations of query results based upon the one or more date slots being assigned numbers of query results above a threshold number (e.g., date slot 314 may be assigned a number of query results above a threshold number, such as 250 query results). The visualization component 304 may construct the storyline comprising at least one query result from respective date slots assigned numbers of query results above a threshold number (e.g., a query result from a date slot may comprise a desired relevancy ranking for the date slot, such as a highest ranked query result).

The interaction component 306 may be configured to process various commands associated with the temporal visualization 308 (e.g., to provide a user with an interactive experience with the temporal visualization 308). In one example, the interaction component 306 may receive a zoom command comprising a selected time span of the temporal visualization 308 (e.g., a zoom-in command and/or a zoom-out command). The interaction component 306 may construct a second temporal visualization comprising query results associated with the selected time span. In another example, the interaction component 306 may receive a hover command comprising a referenced time span of the temporal visualization 308. The interaction component 306 may present a subset of query results assigned to the referenced time span based upon the subset of query results being assigned desired relevancy rankings. In this way, the interaction component 306 may provide a user with an interactive experience with the temporal visualization 308.

FIG. 4 illustrates an example 400 of a temporal distribution 402. The temporal distribution 402 may have been created based upon query results of a query. For example, a user may have submitted a query "super bowl" into an image search engine. The image search engine may have returned query results comprising images relating to the query "super bowl" and timestamps for respective images. To create the temporal distribution 402, the query results may be sorted by dates specified within the timestamps. For example, the temporal distribution 402 may comprise a distribution of the images organized by creation date. For example, a super bowl image (1) 404 may be sorted/grouped with other images created on Jan. 1, 2009. A super bowl after party image 406 may be sorted/grouped with other images created Jan. 2, 2009. A super bowl interview image (1) 408 may be sorted/grouped with other images created on Jan. 3, 2009. A super bowl warm-up image 410 may be sorted/grouped with other images created on Jan. 7, 2010. In this way, the temporal distribution may comprise a distribution of the images sorted by creation date. It may be appreciated that more than merely images can be temporally distributed in such a manner and that the instant application, included the scope of the appended claims, is not to be limited to the examples provided herein.

FIG. 5 illustrates an example 500 of a temporal visualization 502 comprising visual indicators. It may be appreciated that the temporal visualization 502 is merely one example of a temporal visualization (e.g., an x-y graph), and that other examples of temporal visualizations may illustrate query results in a variety of other ways (e.g., graphical data using various types of graphs, images organized by dates, textual descriptions organized by dates, a timeline, a chart, a list of query results organized by dates, etc.). The temporal visualization 502 may have been constructed from query results of a query. For example, the temporal visualization 502 may have been constructed from a temporal distribution created from the query results.

The temporal visualization 502 may comprise a date range 506 of date slots as an x axis of the temporal visualization 502. The temporal visualization 502 may comprise markers along a y axis representing numbers of query results per date slot (e.g., the y axis may comprise a 5 results per date slot marker, a 10 results per date slot marker, a 15 results per date slot maker, etc.). Query results may be assigned to various date slots within the date range 506 (e.g., as points, symbols, images, and/or text along the x axis). For example, query results associated with a date Jan. 8, 2011 within the temporal distribution may be assigned to a Jan. 8, 2011 date slot (e.g., the query results may be illustrated as points on a graph, thumbnails, text, etc.). In this way, the temporal visualization 502 may illustrate query results as a graph, for example.

To aid a user in viewing query results, visual indicators may be associated with query results and/or date slots within the temporal visualization 502. For example, date slot 508 may comprise a comparatively high concentration of query results, and thus the date slot 508 may be assigned a black fill color to indicate that the query results within date slot 508 may be interesting and/or relevant (e.g., given the abundance of results at this date slot, at least some of the query results are likely to be particularly relevant to the query). Date slot 514 may comprise a comparatively medium concentration of query results, and thus the date slot 514 may be assigned a slash fill pattern to indicate that the query results within date slot 514 may be of some interest and/or relevance. Date slot 512 may comprise a comparatively low concentration of query results, and thus the date slot 512 may be assigned a stripe fill pattern to indicate that the query results within date slot 512 may be of low interest and/or relevance. Date slot 510 may comprise a comparatively very low concentration of query results, and thus the date slot 510 may be assigned no fill pattern to indicate that the query results within date slot 510 may be of little to no interest and/or relevance. In this way, a user may visually identify query results within the temporal visualization 502 that may be interesting and/or relevant (e.g., at least as relates to a number or concentration of search results for particular date slots).

Figure 6:
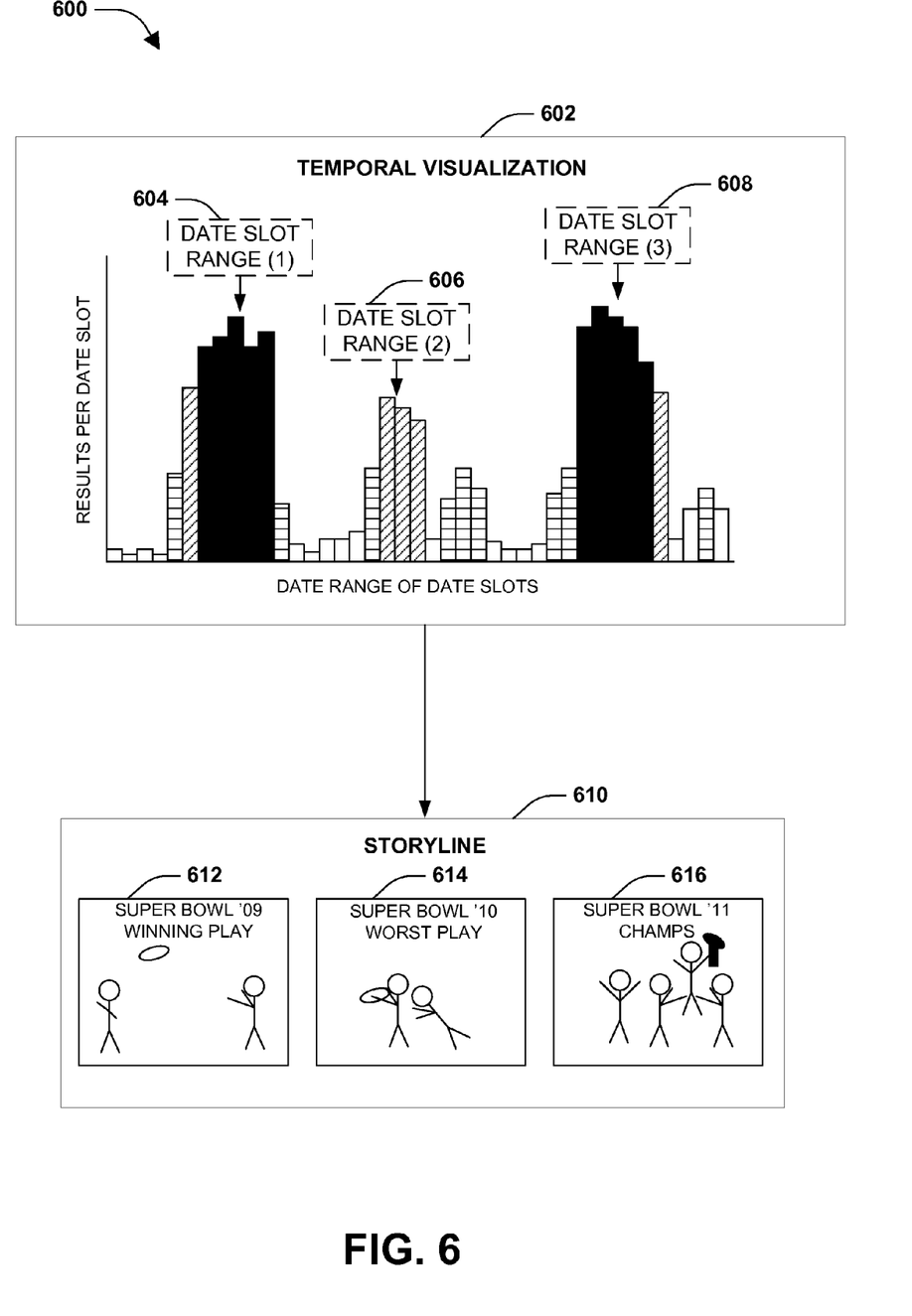
FIG. 6 is an illustration of an example of a storyline constructed from a temporal visualization.

FIG. 6 illustrates an example 600 of a storyline 610 constructed from a temporal visualization 602. The temporal visualization 602 may have been constructed from query results of a query. For example, the temporal visualization 602 may have been constructed from a temporal distribution created from the query results. The storyline 610 may be created from the temporal visualization 602 to provide a quick synopsis/summary of query results over time.

In one example of constructing the storyline 610, one or more date slots within the temporal visualization 602 comprising concentrations of query results may be identified. For example, date slot range (1) 604, date slot range (2) 606, and/or date slot range (3) 608 may be identified based upon respective date slot ranges comprising one or more date slots that are assigned numbers of query results above a threshold number. Because date slot range (1) 604, date slot range (2) 606, and/or date slot range (3) 608 are associated with comparatively high numbers of query results, the date slot ranges may comprise query results that may be highly representative of the query. For example, date slot range (1) 604 may be assigned super bowl images captured around the date of super bowl 2009, date slot range (2) 606 may be assigned super bowl images captured around the date of super bowl 2010, and/or date slot range (3) 608 may be assigned super bowl images captured around the date of super bowl 2011. In this way, the date slot ranges may be assigned super bowl images highly representative of a query "super bowl images" over various dates.

The storyline 610 may be constructed with at least one query result from respective date slots and/or date slot ranges (e.g., a query result from a date slot may comprise a desired relevancy ranking for the date slot, such as a highest relevancy ranking). For example, query result 612 may be assigned a desirable (e.g., highest) relevancy ranking out of query results within the date slot range (1) 604, and thus the query result 612 may be added to the storyline 610. Query result 614 may be assigned a desirable (e.g., highest) relevancy ranking out of query results within the date slot range (2) 606, and thus query result 614 may be added to the storyline 610. Query result 616 may be assigned a desirable (e.g., highest) relevancy ranking out of query results within the date slot range (3) 608, and thus query result 616 may be added to the storyline 610. In this way, the storyline 610 may be constructed with highly relevant query results that may depict information associated with a query over time (e.g., popular images from various super bowls over time).

Figure 7:
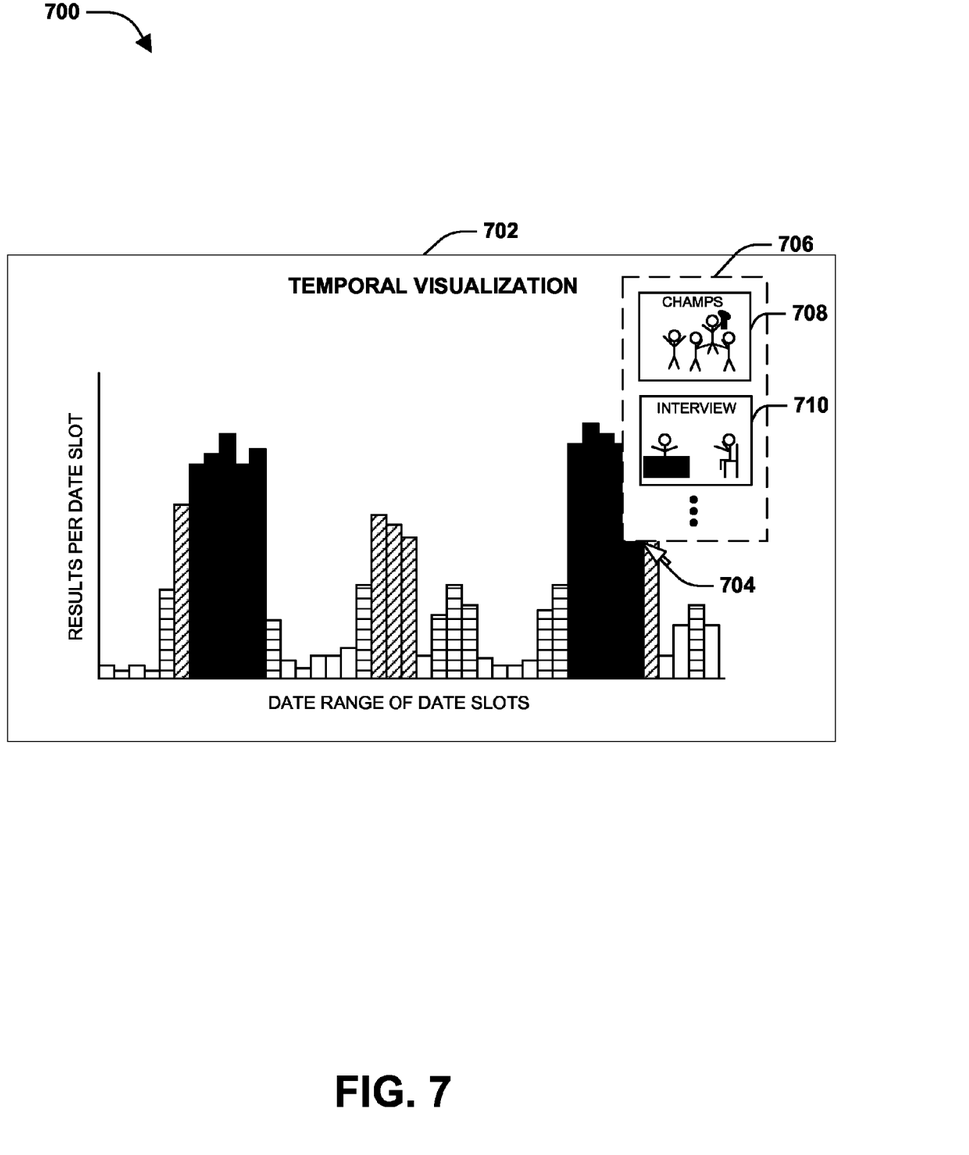
FIG. 7 is an illustration of an example of presenting a subset of query results in response to a hover command associated with a temporal visualization.

FIG. 7 illustrates an example 700 of presenting a subset of query results 706 in response to a hover command 704 associated with a temporal visualization 702. The temporal visualization 702 may have been constructed from query results of a query. For example, the temporal visualization 702 may have been constructed from a temporal distribution created from the query results. Because the temporal visualization 702 may have been constructed from a substantial number of query results (e.g., thousands of query results), subsets of query results may be presented to aid a user in exploring query results illustrated by the temporal visualization 702.

In one example, the hover (e.g., and/or the like) command 704 may be received. For example, a user may hover over and/or select one or more date slots and/or one or more query results within the temporal visualization 702 using a cursor or otherwise. The hover command 704 may comprise a referenced time span of the temporal visualization 702 (e.g., a particular date slot hovered over with the cursor, one or more date slots selected with the cursor, a keystroke, etc.). The subset of query results 706 may be constructed with one or more query results assigned to the referenced time span. The one or more query results may be assigned desired relevancy rankings (e.g., relevancy rankings above a threshold ranking, an N number of top ranked query results, etc.). For example, a user may select a date slot Jan. 8, 2011, a date slot Jan. 9, 2011, and a date slot Jan. 10, 2011 as the referenced time span. Query result 708, query result 710, and/or other query results not illustrated may be used to create the subset of query results 706 based upon such query results being assigned comparatively high relevancy rankings compared with other query results assigned to the referenced time span. Where the user hovers over merely one date slot, the N top ranked query results for that date slot may be displayed, for example. In another example, the hover command 704 may correspond to a user selecting one or more query results (e.g., the user may desire to see a larger representation of the selected query results). Because the user may have selected particular query results, the subset of query results 706 may comprise the selected query results regardless of relevancy rankings assigned to the selected query results (e.g., thumbnails of the selected query results may be used to construct the subset of query results 706 to provide the user with a zoomed-in view of the selected query results). In this way, the subset of query results 706 may be presented to the user based upon the hover command 704.

Figure 8:
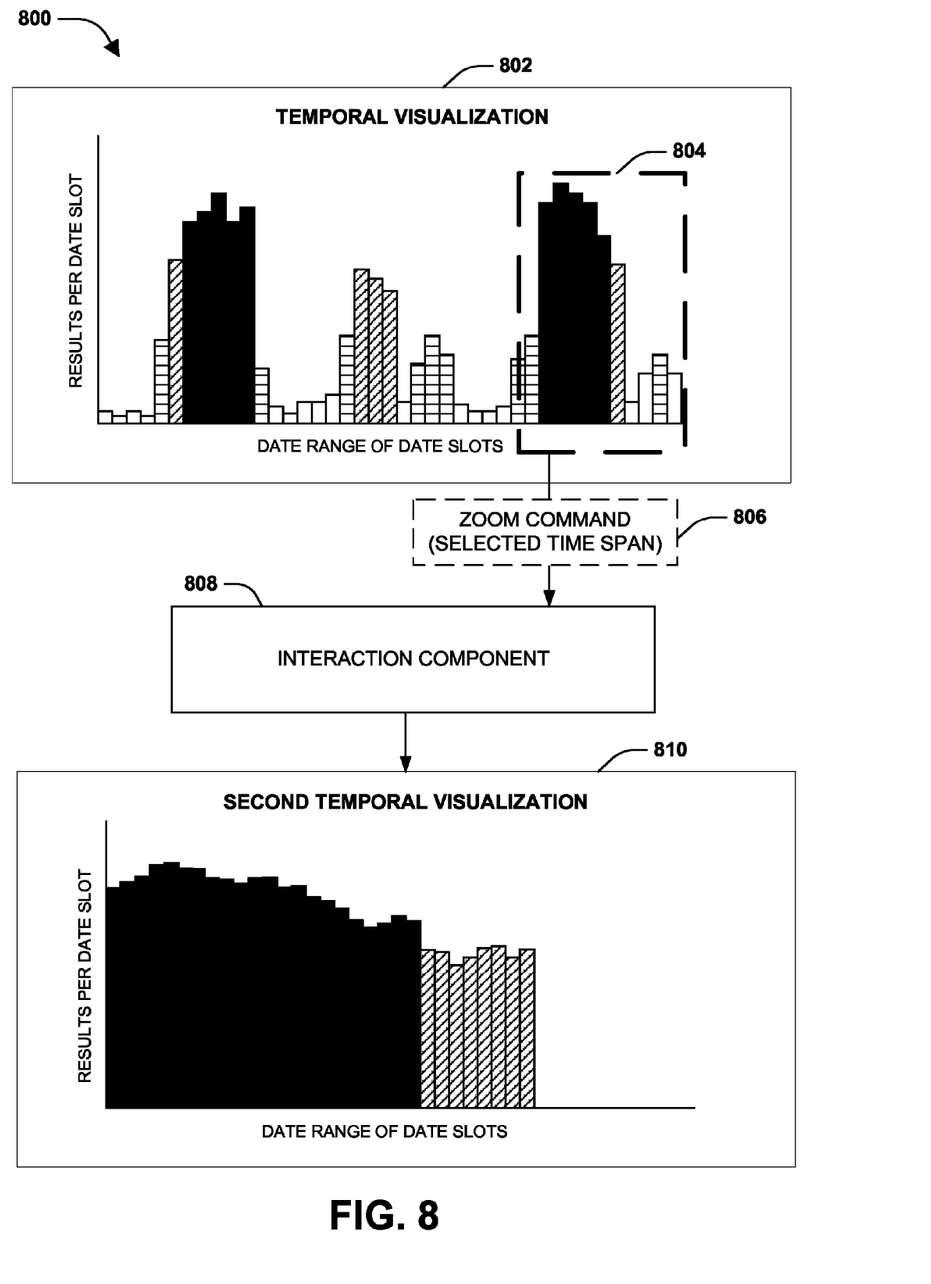
FIG. 8 is an illustration of an example of a second temporal visualization constructed based upon a zoom command associated with a temporal visualization.

FIG. 8 illustrates an example 800 of a second temporal visualization 810 constructed based upon a zoom command 806 associated with a temporal visualization 802. The temporal visualization 802 may have been constructed from query results of a query. For example, the temporal visualization 802 may have been constructed from a temporal distribution created from the query results. An interaction component 808 may be configured to process commands associated with the temporal visualization 802, such as zoom commands.

In one example of processing a zoom command, the interaction component 808 may receive the zoom command 806 comprising a selected time span of the temporal visualization 802 (e.g., a user may select 804 one or more date slots as the selected time span). The interaction component 808 may determine that the zoom command 806 is a zoom-in command (e.g., the user may desire to visualize query results at a finer granularity). The interaction component 808 may construct the second temporal visualization 810 comprising query results associated with the selected time span. In this way, the second temporal visualization 810 may provide a finer granularity of query results across the selected time span. In one example of providing finer granularity of query results, a date slot of the temporal visualization 802 may be split into multiple date slots spanning smaller time spans within the second temporal visualization 810. In another example, query results within the second temporal visualization 810 may be enlarged (e.g., the query results within the second temporal visualization 810 may be sparse, such that the query results may be illustrated as thumbnails as opposed to merely points on a graph).

Figure 9:
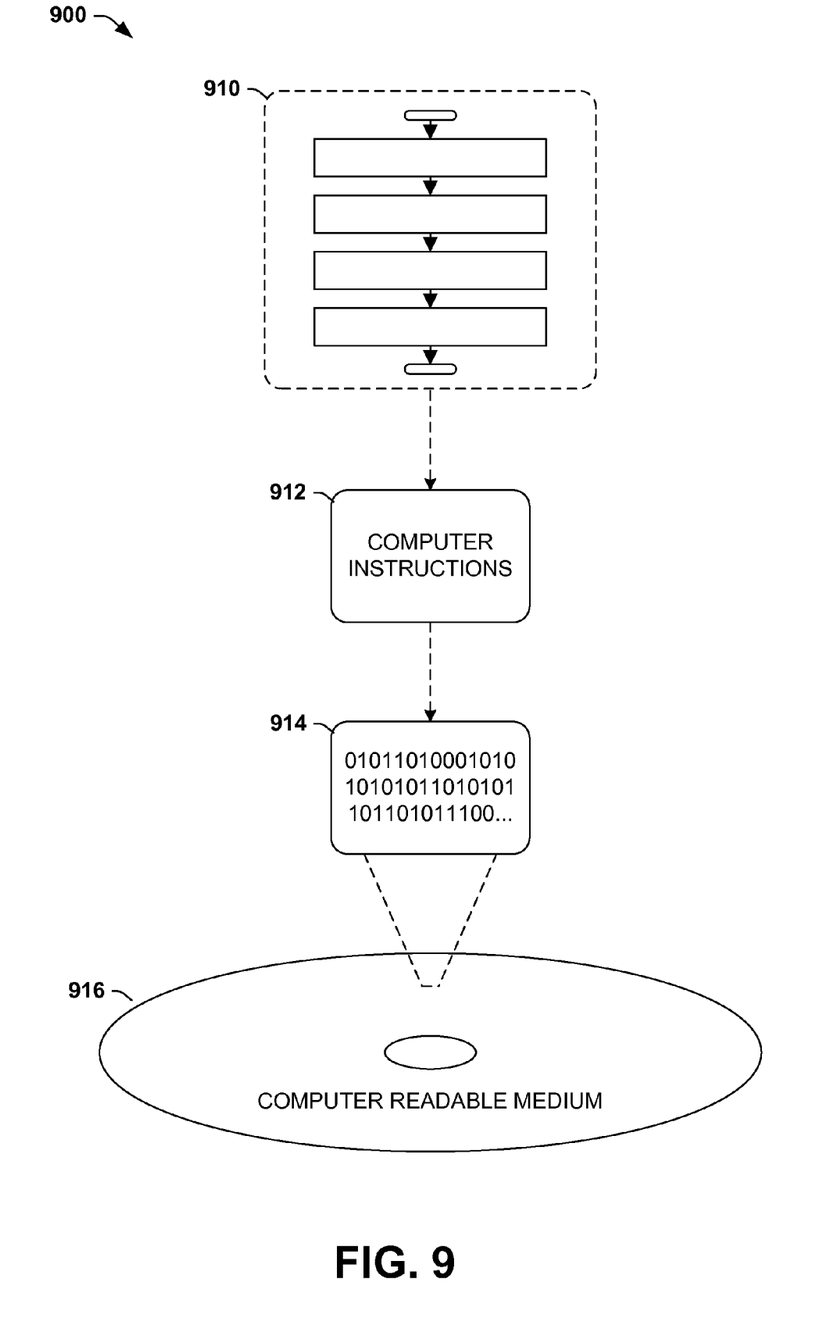
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as at least some of the exemplary method 200 of FIG. 2, for example. In another such embodiment, the processor-executable instructions 912 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
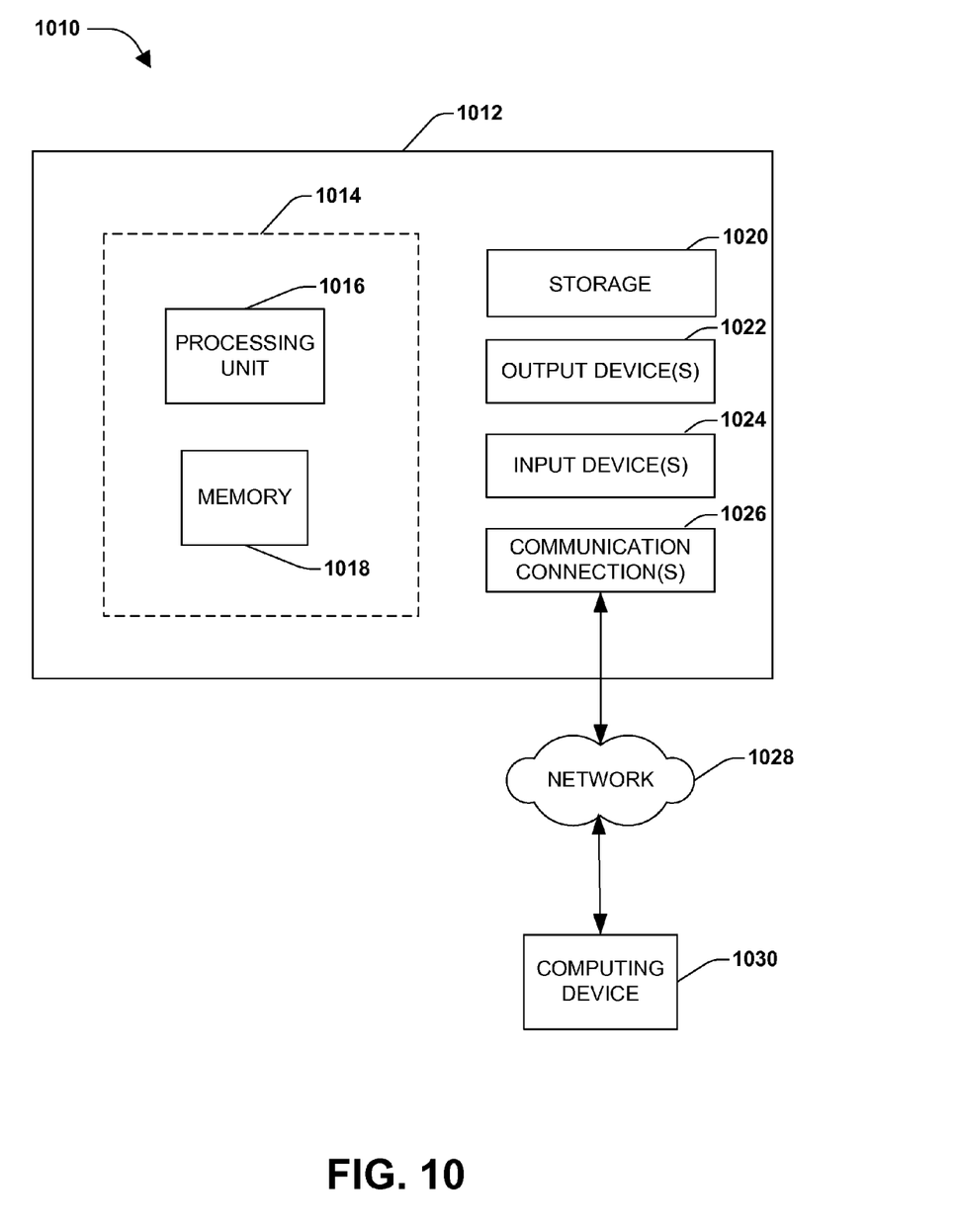
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for constructing a storyline from a temporal-distribution of query results, comprising:
    receiving query results associated with a query;
    creating a temporal distribution of the query results based upon timestamps associated with respective query results;
    identifying a set of date slots within the temporal distribution based upon respective date slots within the set of date slots being assigned numbers of query results above a threshold concentration number;
    for respective date slots within the set of date slots:
        selecting a query result from a date slot based upon the query result having a desired relevancy ranking for the date slot; and
        extracting a visualization associated with the query result based upon the visualization representing the query result;
    constructing a storyline for the query based upon respective visualizations; and
    presenting the storyline in response to a user selection of at least one of:
        a time span;
        one or more date slots, or
        one or more date ranges.

2. The method of claim 1, the query result corresponding to a social network post, and the visualization corresponding to a social network image.

3. The method of claim 1, the query result comprising a video, and the visualization comprising a portion of the video.

4. The method of claim 1, comprising:
constructing a temporal visualization of the query results using the temporal distribution.

5. The method of claim 1, the query result corresponding to a local file, and the visualization corresponding to a description of the local file.

6. The method of claim 4, comprising:
associating a visual indicator with one or more query results assigned to a first date slot within the temporal visualization.

7. The method of claim 4, comprising:
identifying a concentration of query results assigned to a first date slot within the temporal visualization based upon the first date slot being assigned a number of query results above a threshold number; and
associating a visual indicator with at least one of the query results assigned to the first date slot.

8. The method of claim 1, the query result comprising an image, and the visualization comprising at least a portion of the image.

9. The method of claim 4, comprising:
identifying a subset of query results assigned to a first date slot within the temporal visualization based upon the subset of query results being assigned one or more desired relevancy rankings.

10. The method of claim 1, the presenting comprising:
animating the storyline.

11. The method of claim 4, comprising:
receiving a zoom-in command; and
constructing a second temporal visualization based upon the zoom-in command.

12. The method of claim 4, comprising:
receiving a zoom-out command; and
constructing a second temporal visualization based upon the zoom-out command.

13. The method of claim 1, the user selection comprising a hover command.

14. The method of claim 1, the constructing comprising:
constructing the storyline in real-time during a search query session.

15. A system for constructing a storyline from a temporal-distribution of query results, comprising:
one or more processing units; and
memory comprising instructions that when executed by at least one of the one or more processing units implement at least some of:
a visualization component configured to:
receive query results associated with a query;
create a temporal distribution of the query results based upon timestamps associated with respective query results;
identify a set of date slots within the temporal distribution based upon respective date slots within the set of date slots being assigned numbers of query results above a threshold concentration number;
for respective date slots within the set of date slots:
select a query result from a date slot based upon the query result having a desired relevancy ranking for the date slot; and
extract a visualization associated with the query result based upon the visualization representing the query result;
construct a storyline for the query based upon respective visualizations; and
present the storyline in response to a user selection of at least one of:
a time span;
one or more date slots, or
one or more date ranges.

16. The system of claim 15, comprising:
an interaction component configured to:
receive a zoom command; and
construct a second storyline based upon the zoom command.

17. The system of claim 15, the query result corresponding to a social network post, and the visualization corresponding to a social network image.

18. The system of claim 15, the query result comprising at least one of an image or a video, and the visualization comprising at least one of a portion of the image or a portion of the video.

19. The system of claim 15, the query result comprising a representation of a consumer product, and the visualization comprising an image of the consumer product.

20. A computer readable storage device comprising computer executable instructions that when executed via a processing unit perform a method for constructing a storyline from a temporal distribution of query results, comprising:
receiving query results associated with a query;
creating a temporal distribution of the query results based upon timestamps associated with respective query results;
identifying a set of date slots within the temporal distribution based upon respective date slots within the set of date slots being assigned numbers of query results above a threshold concentration number;
for respective date slots within the set of date slots:
selecting a query result from a date slot based upon the query result having a desired relevancy ranking for the date slot; and
extracting a visualization associated with the query result based upon the visualization representing the query result;
constructing a storyline for the query based upon respective visualizations; and
presenting the storyline in response to a user selection of at least one of:
a time span;
one or more date slots, or
one or more date ranges.

* * * * *